United States Patent [19]

Bjorklund

[11] Patent Number: 4,748,631
[45] Date of Patent: May 31, 1988

[54] MODULATED LASER SOURCE FOR OPTICAL STORAGE

[75] Inventor: Gary C. Bjorklund, Los Altos, Calif.

[73] Assignee: International Business Machines, Armonk, N.Y.

[21] Appl. No.: 46,967

[22] Filed: May 6, 1987

[51] Int. Cl.[4] .............................................. H01S 3/10
[52] U.S. Cl. ...................................... 372/21; 372/26; 372/22; 372/82
[58] Field of Search ....................... 372/26, 21, 22, 82, 372/92, 69

[56] References Cited

U.S. PATENT DOCUMENTS

| | | | |
|---|---|---|---|
| 4,181,899 | 1/1980 | Lui ......................................... | 372/22 |
| 4,314,210 | 2/1982 | Everett .................................. | 372/18 |
| 4,413,342 | 11/1983 | Cohen et al. ......................... | 372/21 |
| 4,510,402 | 4/1985 | Summers et al. .................... | 307/427 |
| 4,618,957 | 10/1986 | Lui ......................................... | 372/21 |
| 4,631,732 | 12/1986 | Christensen .......................... | 372/82 |
| 4,653,056 | 3/1987 | Baer et al. ............................. | 372/21 |
| 4,660,206 | 4/1987 | Halmos et al. ........................ | 372/21 |

OTHER PUBLICATIONS

M. A. Henesian, J. Goldhar, and R. A. Haas, "Electro-Optic Harmonic Conversion Switch for Large-Aperture Multipass Laser Systems," Aug. 1984, vol. 9, No. 8, Optics Letters.

Primary Examiner—Leon Scott, Jr.
Attorney, Agent, or Firm—Otto Schmid, Jr.

[57] ABSTRACT

A time modulated source of frequency doubled laser radiation is described in which a non-linear crystal part of a stripline electrical circuit is mounted within a laser cavity so that the laser beam at a fundamental frequency impinges on and propagates through the non-linear crystal. A high bandwidth electrical data signal is coupled into the stripline electrical circuit to produce an electric field across the non-linear crystal so that an output beam is produced at a wavelength corresponding to the second harmonic of the fundamental frequency which represents a frequency doubled output beam modulated in accordance with the high bandwidth data signal, an alternate embodiment for producing the time modulated source of frequency doubled laser radiation has the non-linear crystal placed in a resonant microwave cavity. A high bandwidth electrical signal modulates the intensity of the microwave electric field across the non-linear crystal so that an output beam is produced at a wavelength corresponding to the second harmonic of the fundamental frequency which represents a frequency doubled output beam modulated in accordance with the high bandwidth data signal.

14 Claims, 2 Drawing Sheets

MODULATED LASER SOURCE FOR OPTICAL STORAGE

BACKGROUND OF THE INVENTION

1. Field of the Invention

This invention relates to a laser source and more particularly to a modulated laser source suitable for optical storage applications.

2. Prior Art

Laser sources have long been regarded as the primary light sources for optical storage applications. For such applications the laser source should be compact, reliable, low cost and have sufficient power for high data rate recording and reading of data on an optical storage medium. In addition, a short wavelength source is needed to achieve the highest possible storage density.

To date, short wavelength laser sources that have sufficient power to produce the required high data rates have neither had a modulation rate sufficiently high for the optical storage application nor control by voltages approaching the logic level voltages which are preferred for an optical storage system.

One potential means of producing short wavelength laser radiation is to use nonlinear optical processes such as frequency doubling to generate higher harmonics of existing practical laser sources.

U.S. Pat. No. 4,510,402 to Summers et al discloses a harmonic generator comprising a pair of uniaxial birefringent KDP crystal elements. The crystal elements are fixed in a position in a series arrangement which provides either a linearly or elliptically polarized second harmonic wave. The "e" directions of the crystal elements are oriented in quadrature.

The publication "Electro-Optic Harmonic Conversion Switch for Large-Aperture Multipass Laser Systems" by Henesian et al, Optics Letters, Vol. 9, No. 8, August, 1984 pp. 365–7 discusses a switched second harmonic generation system for high-power laser systems. This system utilizes a KDP crystal, and a voltage of 52KV is applied to electrodes arranged longitudinally on the crystal to produce the switching of the fundamental beam to the second harmonic beam.

U.S. Pat. No. 4,314,210 to Everett shows an optical system comprising an electro-optic modulator, KDP, which can be positioned within a laser cavity and energized with a periodically varying signal superimposed on a ramp voltage to produce both mode-locking and chirping of the laser output. The ramp voltage amplitude is several thousand volts.

Everett shows a crystal within a laser cavity but he does not suggest second harmonic generation. Both Summers and Henesian show second harmonic generation, but there is no suggestion that the crystal could be located within the laser cavity. All of the references require high control voltages which are not compatible with the high data rates required for optical storage applications, and, in addition, none of the references suggest that the crystal could be included as part of an electrical stripline circuit.

SUMMARY OF THE INVENTION

It is therefore the principal object of this invention to provide a modulated laser source which includes a non-linear crystal for second harmonic generation.

In accordance with the invention, the objective is achieved by having a stripline electrical circuit in which a non-linear crystal forms part of the stripline electrical circuit. The stripline electrical circuit is mounted so that a beam at a fundamental wavelength impinges on and propagates through the non-linear crystal. A high bandwidth electrical signal is coupled into the electrical stripline circuit to produce an electric field across the non-linear crystal which controls the efficiency whereby an output beam is produced at the second harmonic of the fundamental wavelength. The output beam represents an output modulated in accordance with the high bandwidth electric signal which can represent data to be stored, for example. In a specific embodiment, the non-linear crystal is located within the laser cavity and the non-linear crystal is potassium titanyl phosphate, $KTiOPO_4$ (KTP).

In another specific embodiment, the non-linear crystal is not mounted in a stripline circuit, but is mounted within a resonant microwave cavity. The microwave cavity assembly is mounted so that a beam at a fundamental wavelength impinges on and propagates through the non-linear crystal. A high bandwidth electrical signal is coupled to control an RF switch which in turn controls a microwave electric field across the non-linear crystal which controls the efficiency whereby an output beam is produced at the second harmonic of the fundamental wavelength.

The foregoing and other objects, features and advantages of the invention will be apparent from the following more particular description of a preferred embodiment of the invention as illustrated in the accompanying drawings.

DETAILED DESCRIPTION OF THE PREFERRED EMBODIMENTS

Figure 1:
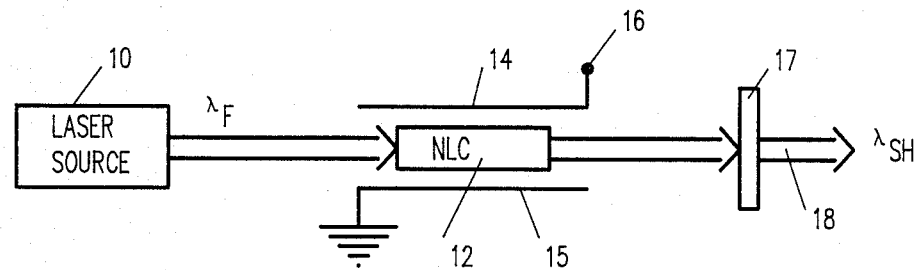
FIG. 1 is a diagrammatic schematic diagram of the optical system comprising the present invention.

Referring to FIG. 1, the optical system, according to an embodiment of the present invention, comprises a laser source 10 which has an output at a fundamental wavelength $\lambda_F$ which is directed toward a non-linear crystal 12 which is part of an electrical stripline circuit 14. The non-linear crystal 12 is cut and oriented with respect to the output beam of the laser source 10 in such a manner that a second harmonic $\lambda_{SH}$ is generated when a suitable electric field is present across the crystal 12. In the embodiment shown in the drawings, the electric field for controlling the second harmonic generation is provided by a suitable voltage signal coupled between the ground plane electrode 15 and the control conductor 16 of the electrical stripline circuit 14. A filter 17 is provided to filter out the fundamental wavelength $\lambda_F$ and pass the second harmonic wavelength $\lambda_{SH}$. In an optical storage application, signal representing the data to be stored is coupled to the electrical stripline circuit 14 to produce a pulse of radiation at wavelength $\lambda_{SH}$ which is directed in beam 18 to a suitable optical recording medium.

Figure 2:
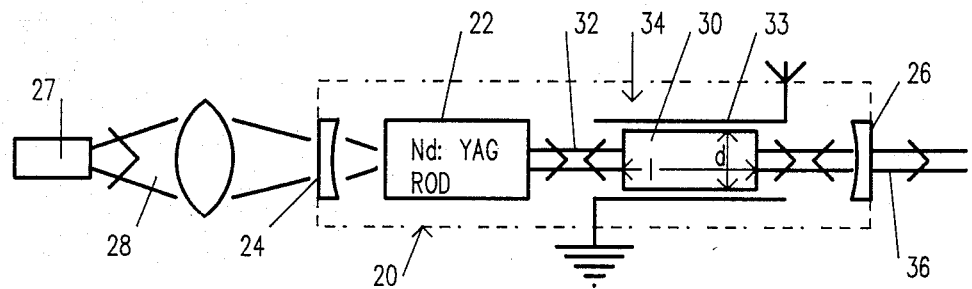
FIG. 2 is a diagrammatic schematic diagram of an alternate embodiment of the optical system comprising the present invention.

In the embodiment of the invention shown in FIG. 2, the non-linear crystal and the electrical stripline circuit are mounted inside a laser cavity. In this embodiment, a laser source 20 is shown which comprises a suitable lasing material such as a Nd:YAG rod 22 and mirrors 24, 26 which are highly reflective at the fundamental wavelength $\lambda_F$ of the laser source. A source of pumping power 27, such as a GaAs diode array, is positioned to direct its output, in beam 28, to the Nd:YAG rod. This produces a fundamental wave at 10,640A, within the laser cavity which can build up to about the thirty watt level. The non-linear crystal 30 is positioned within the path of the fundamental radiation beam 32 in the laser cavity, and a suitable electric field produced across crystal 30 controls the phase matching of the doubling process via the linear electro-optic effect, thereby producing the desired modulation of the second harmonic. Mirror 26 is designed to be transparent to the 5320A second harmonic radiation so that a modulated output beam 36 is produced which can be used for an optical recording application, for example.

In a specific embodiment, the non-linear crystal is a long aspect ratio crystal of potassium titanyl phosphate, $KTiOPO_4$ (KTP) and the orientation of the crystal is shown in FIG. 2. The laser radiation propagates in the long direction 1 and the stripline voltage is applied in the short direction d. The short direction d is parallel to the crystallographic z axis and the long dimension 1 is in the crystallographic XY plane at a 26 degree angle to the X axis. This is the crystal orientation that produces efficient second harmonic generation of 10,640 A radiation. Other suitable inorganic materials are potassium niobate, $KNbO_3$; lithium niobate, $LiNbO_3$; beta barium borate, $\beta$-$BaB_2O_4$; and lithium iodate, $LiIO_3$.

Suitable organic materials may also be used as the non-linear crystal. These materials are characterized by high non-linearity and high linear electro-optic coefficients. Suitable organic non-linear materials include 3-methyl-4-nitroaniline (MNA), N-(4-nitrophenyl)-L-prolinol (NPP), 3-methyl-4-nitropyridene-1-oxide (POM), methyl-(2-4-dinitrophenyl)-aminopropanoate (MAP), 4-(N, N-dimethylamino)-3-acetonidonitrobenzene (DAN) and 6-cyclooctylamine-3-nitropyridine (COANP).

Figure 3:
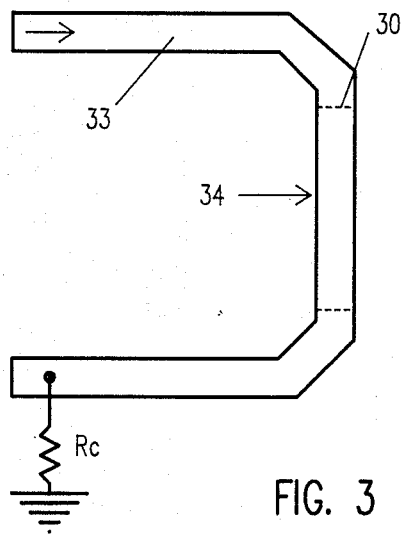
FIG. 3 is a top view of the stripline circuit of FIGS. 1 and 2.

FIG. 3 shows a top view of the RF stripline circuit 34. The stripline circuit 34 comprises a control electrode 33 which is separated from the ground plane electrode by a suitable dielectric and the non-linear crystal 30 (shown in dashed lines in FIG. 3) comprises at least part of the dielectric material.

Figure 4:
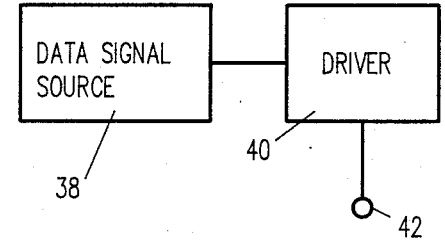
FIG. 4 is a schematic block diagram of the circuit for generating the control signals for the laser source comprising the present invention.
Figure 5:
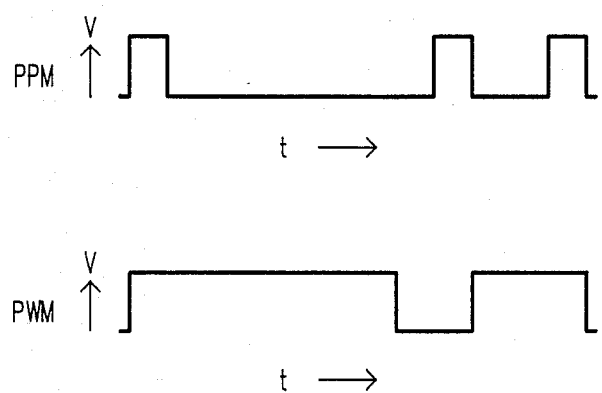
FIG. 5 is a timing diagram showing the voltage waveforms for control of the laser source.

The control signal, which produces the second harmonic modulation is produced by the circuit shown in FIG. 4. A data signal source 38 produces a series of coded data signals which may represent data to be recorded, for example. These signals are usually generated as logic level signals and, in principle, it is desired to be able to use these logic level signals directly to control the second harmonic generation. In this case, the driver circuit 40 would not be required and the logic level data signals would appear at output terminal 42 substantially as shown in FIG. 5. However, the present state of development requires control signals of higher amplitudes, so the driver circuit 40 would be required. For KTP, the signal level may approach 100 volts, while the control signal amplitudes for the organic materials mentioned above is substantially less. In principle these materials could be used without a driver 40.

The control pulses can be coded in different manners as shown in FIG. 5. In the upper figure, the control pulses are coded with respect to their relative spacing on a time scale in which the pulses have a predetermined amplitude and a duration of 10 nanoseconds per unit width. In the lower figure, the control signals are coded according to pulse width in which the pulses have a predetermined amplitude and a predetermined width in numbers of units. The control signals, as shown in FIG. 5, are coupled to the control electrode 33 of the RF stripline circuit 34.

Figure 6:
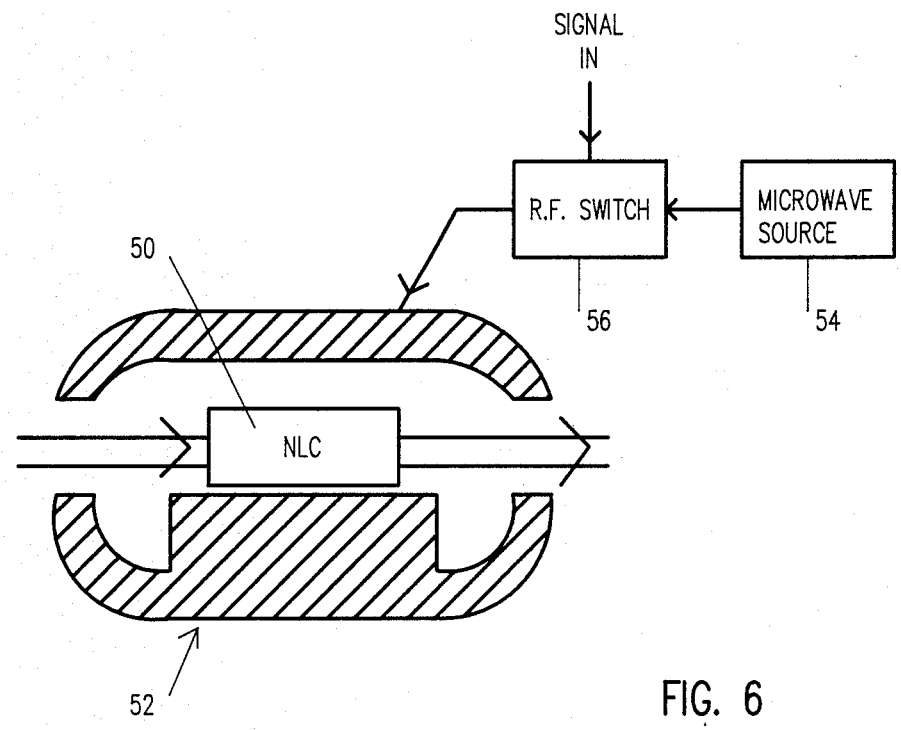
FIG. 6 is a diagrammatic schematic diagram of another embodiment of the optical system comprising the present invention.

The embodiment of the invention shown in FIG. 6 has the non-linear crystal 50 oriented as before, but now placed in a resonant microwave cavity 52 with a Q on the order of 10 and a resonant frequency on the order of 5 GHz from microwave source 54. The desired modulation waveform is used to modulate the intensity of the 5 GHz carrier using an RF switch 56. The resonant microwave radiation controls the phase matching of the non-linear crystal.

While the invention has been particularly shown and described with reference to a preferred embodiment thereof, it will be understood by those skilled in the art that various other changes in the form and details may be made therein without departing from the spirit and scope of the invention.

Having thus described my invention, what I claim as new, and desire to secure by Letters Patent is:

1. Apparatus for producing a time modulated source of frequency doubled laser radiation comprising:
   a stripline electrical circuit;
   a non-linear crystal forming part of said stripline electrical circuit;
   laser means for producing laser radiation comprising a beam at a fundamental wavelength;
   means for mounting said stripline electrical circuit so that said beam at a fundamental wavelength impinges on and propagates through said non-linear crystal;
   a high bandwidth electrical signal; and
   means for coupling said electrical signal into said stripline electrical circuit to produce an electric field across said non-linear crystal which controls the intensity of an output beam produced at the second harmonic wavelength.

2. The apparatus of claim 1 wherein said non-linear crystal is mounted internal to the optical cavity of said laser means producing said beam at a fundamental wavelength.

3. The apparatus of claim 2 wherein said non-linear crystal is an inorganic material selected from the group consisting of potassium titanyl phosphate, potassium niobate, lithium niobate, beta barium borate and lithium iodate.

4. The apparatus of claim 3 wherein said non-linear crystal is potassium titanyl phosphate.

5. The apparatus of claim 4 wherein said laser means is a Nd:YAG laser.

6. The apparatus of claim 5 wherein a semiconductor diode laser is used to optically pump said Nd:YAG laser.

7. The apparatus of claim 2 wherein said non-linear crystal is an organic material selected from the group consisting of MNA, NPP, POM, MAP, DAN and COANP.

8. Apparatus for producing a time modulated source of frequency doubled laser radiation comprising:
   a resonant microwave cavity;
   a non-linear crystal mounted within said resonant microwave cavity;
   laser means for producing laser radiation comprising a beam at a fundamental wavelength;
   means for mounting said cavity so that said beam at a fundamental wavelength impinges on and propagates through said non-linear crystal;
   a high bandwidth electrical signal; and
   means for coupling said electrical signal to produce a modulated microwave electrical field across said non-linear crystal which controls the intensity of an output beam produced at the second harmonic wavelength.

9. The apparatus of claim 8 wherein said non-linear crystal is mounted internal to the optical cavity of said laser means producing said beam at a fundamental wavelength.

10. The apparatus of claim 9 wherein said non-linear crystal is an inorganic material selected from the group consisting of potassium titanyl phosphate, potassium niobate, lithium niobate, beta barium borate and lithium iodate.

11. The apparatus of claim 10 wherein said non-linear crystal is potassium titanyl phosphate.

12. The apparatus of claim 11 wherein said laser means is a Nd:YAG laser.

13. The apparatus of claim 12 wherein a semiconductor diode laser is used to optically pump said Nd:YAG laser.

14. The apparatus of claim 10 wherein said non-linear crystal is an organic material selected from the group consisting of MNA, NPP, POM, MAP, DAN and COANP.

* * * * *